United States Patent Office 3,420,895
Patented Jan. 7, 1969

3,420,895
PROCESS OF PRODUCING HYDROQUINONE
Hachiro Wakamatsu, Tokyo, and Masahiko Takesada and Jiro Sato, Kanagawa-ken, Japan, assignors to Ajinomoto Co., Inc., Tokyo, Japan
No Drawing. Filed July 11, 1966, Ser. No. 564,042
Claims priority, application Japan, July 13, 1965, 40/42,162; Dec. 22, 1965, 40/79,069; Apr. 14, 1966, 41/23,762
U.S. Cl. 260—621                14 Claims
Int. Cl. C07c 37/00

ABSTRACT OF THE DISCLOSURE

The yield of hydroquinone from the known reaction between acetylene and carbon monoxide in an inert hydrogen-bearing solvent in the presence of a rhodium catalyst can be increased greatly by holding the acetylene concentration in the reaction medium below 1.5 moles per liter. Under these conditions, the pressure can be held at 150 to 300 atmospheres without loss in yield, and the amount of catalyst present can be reduced, particularly in the simultaneous presence of hydrogen.

---

This invention relates to a process of preparing hydroquinone from acetylene and carbon monoxide or synthesis gas in a single step.

It has been known that hydroquinone can be produced by heating acetylene and carbon monoxide in the presence of rhodium compounds in a liquid reaction medium (U.S. Patent No. 3,055,949; British Patent No. 850,433). The known method requires a carbon monoxide pressure of 700–1500 atmospheres, and the reaction takes 10 to 18 hours. The yield of hydroquinone is about 40% at best.

The present invention is an improvement of the known method and is based on the discovery that a critically important acetylene concentration of less than 2 moles per liter permits the carbon monoxide pressure to be reduced to 150–500 atmospheres, while the yield of hydroquinone is increased.

The importance of the acetylene concentration will be evident from the following data on experiments in each of which 50 ml. of a solvent and $Rh_2O_3 \cdot 5H_2O$ as a catalyst were charged into a 100 ml. autoclave of stainless steel, whereupon acetylene was absorbed in the solvent while the autoclave was cooled in Dry Ice and methanol. The autoclave was then warmed in water, and carbon monoxide or synthesis gas was introduced under pressure. The thermostat was held at a fixed reaction temperature until no further gas was absorbed. The autoclave was permitted to cool, and the discharged reaction mixture was analyzed for hydroquinone by titration or by gas chromatography.

The titration method employed has been described in Kogyo Kagaku-Zasshi, 55, 283 (1952). Hydroquinone in the reaction mixture was oxidized to para-quinone by adding a known amount of cerium sulfate, and the excess of cerium sulfate was titrated with ferrous sulfate.

The relevant details of the chromatographic method were as follows:

Column: Carbowax 20 M. 2.5% Chromosorb W (White) prepared by Yanagimoto Co. (Japan), 60–80 mesh, 1 m. x 4 mm.
Temperature: 160° C.
Carrier gas: Helium 100 ml./minute.

The fumaric acid ester, succinic acid ester and acrylic acid ester formed as by-products were determined by gas chromatography.

Table 1 lists the results of experiments in which the solvent was methanol, the reaction temperature 130° C., the amount of catalyst equivalent to 0.5 g. rhodium per liter, and the initial CO pressure was 230–250 atmospheres. HQ(t) indicates hydroquinone yield in percent of acetylene used as determined by titration, and HQ(g) the analogous value as determined by gas chromotography.

TABLE 1

| Run No. | $C_2H_2$ (moles/l.) | Reaction Time (minutes) | HQ(t) | HQ(g) |
|---|---|---|---|---|
| 1 | 2.4 | 450 | 43.4 | |
| 2 | 2.0 | 430 | 57.5 | |
| 3 | 1.5 | 185 | 58.1 | 51 |
| 4 | 1.0 | 75 | 75.8 | 60 |
| 5 | 0.50 | 30 | 68.8 | 56 |
| 6 | 0.25 | 10 | 99.0 | 69 |

As is evident from Table 1, the concentration of acetylene in the reaction medium has a decisive influence on the yield of hydroquinone. It is necessary to employ less than 2 moles per liter. In general, 0.1–2.0 moles per liter, preferably 0.5–1.5 moles acetylene per liter of solvent are used in our process.

The initial pressure of carbon monoxide may be within the range of 150–500 atmospheres. The yield increases with carbon monoxide pressure up to about 150 atmospheres, but is practically independent of pressure between 150 and 300 atmospheres. At higher pressures, the catalyst tends to be converted to a black rhodium compound which lacks catalytic activity and is insoluble in most solvents.

Table 2 illustrates the effect of the carbon monoxide pressure on the reaction. In this table, FE, SE, and AE respectively indicate the percent conversion of acetylene to fumaric acid ester, succinic acid ester, and acrylic acid ester. Methanol was used as a solvent. The acetylene concentration was 1.28 moles per liter. Temperature and catalyst concentration were as in Table 1.

TABLE 2

| Run No. | Initial CO pressure (atms.) | Reaction time (min.) | HQ(t) | FE | SE | AE | Formation of Insoluble Rh compound |
|---|---|---|---|---|---|---|---|
| 1 | 50  | ---   | 10.5 | (¹) | ---  | 2.9 | --- |
| 2 | 100 | 1,215 | 43.4 | 8.9 | 2.4  | 5.5 | --- |
| 3 | 200 | 275   | 70.3 | 15  | 1.3  | 2.0 | --- |
| 4 | 250 | 150   | 71.6 | 15  | 7.6  | 3.5 | --- |
| 5 | 300 | 115   | 68.5 | } Not determined { | | | + |
| 6 | 400 | 140   | 66.3 | } Not determined { | | | +++ |
| 7 | 500 | 120   | 70.4 | } Not determined { | | | ++++ |

¹ Trace.

The structure of the rhodium compound which actually catalyzes the reaction is not known but rhodium metal and rhodium compounds which are soluble in the solvent employed under the reaction conditions, or are converted to soluble compounds, are suitable sources of catalyst. Rhodium compounds which have been used successfully include the halides, oxides, hydroxides, organic and inorganic salts, dicarbonylhalides and tetracarbonylhalides of rhodium. An amount of catalyst source containing 0.1–0.5 g./l. rhodium as the element is sufficient, and the yield of hydroquinone is affected only little by variations within this range. However, the time required for the completion of the reaction is shorter at higher Rh concentrations. At 0.1 g./l. Rh, the reaction time is generally about three times that at 0.5 g./l. Rh.

The reaction is usually completed within a few hours. Further heating after completion of the reaction does not influence the yield significantly as illustrated in Table 3, which lists results obtained by heating the reaction mixture produced with methanol as a solvent containing 0.5 mole $C_2H_2$ per liter, an initial CO pressure of 230 atmospheres, a reaction temperature of 130° C., and a catalyst containing 0.5 g. Rh per liter of solvent. The reaction was completed in all runs in about 30 minutes.

TABLE 3

| Run No. | Heating time (min.) | HQ(t) | FE |
|---|---|---|---|
| 1 | 5 | 48.4 | 16 |
| 2 | 10 | 56.8 | 13 |
| 3 | 20 | 58.0 | 20 |
| 4 | 30 | 70.0 | 16 |
| 5 | 40 | 68.0 | 22 |
| 6 | 50 | 63.0 | 22.5 |
| 7 | 60 | 60.0 | 18.5 |
| 8 | 100 | 67.0 | 19 |

The reaction temperature should be between 100 and 170° C., and 110 to 140° C. are preferred. When the temperature is higher than 140° C., conversion of rhodium catalyst to the insoluble black compound is observed and the yield of hydroquinone is reduced at temperatures above 170° C.

Suitable liquid inert reaction media include lower aliphatic alcohols, such as methanol, ethanol, iso-propanol, n-propanol and n-butanol, formamide, dimethyl formamide, such lactams as α-pyrrolidone and N-methyl-α-pyrrolidone, ketones such as acetone, ethers such as dioxane and tetrahydrofuran, water, and homogeneous mixtures of these solvents. Mixtures of water with water soluble organic solvents are preferred.

Table 4 lists the results obtained with various liquid reaction media at an initial CO pressure of 250 atmospheres, a reaction temperature of 130° C., and a catalyst content equivalent to 0.5 g./l. Rh. The reaction time in water and formamide was less than 30 minutes and could not be determined.

TABLE 4

| Run No. | Solvent (v./v.) | Concentration of $C_2H_2$ (mole/l.) | Reaction time (min.) | HQ(t) |
|---|---|---|---|---|
| 1 | Ethanol | 1.0 | 220 | 60.8 |
| 2 | Iso-propanol | 1.0 | 280 | 57.7 |
| 3 | n-Propanol | 1.0 | 180 | 58.0 |
| 4 | n-Butanol | 1.0 | 170 | 45.6 |
| 5 | α-Pyrrolidone | 0.57 | 30 | 84.6 |
| 6 | N-methyl-α-pyrrolidone | 1.0 | 600 | 84.3 |
| 7 | Pyridine | 0.72 | 25 | 70.4 |
| 8 | Formamide | 0.25 | | 73.0 |
| 9 | Dimethyl formamide | 1.0 | 235 | 71.2 |
| 10 | Acetone | 1.0 | 1,160 | 51.0 |
| 11 | Water | 0.14 | | 57.6 |
| 12 | Methanol (1) plus α-pyrrolidone (1) | 0.45 | 25 | 67.2 |
| 13 | Methanol (7) plus water (3) | 1.0 | 18 | 70.2 |
| 14 | Methanol (1) plus water (1) | 0.33 | 3 | 65.1 |

We have found that the hydroquinone yield can be increased further if elementary hydrogen is present in the reaction system. Hydrogen prevents formation of fumaric acid ester and stabilizes the rhodium catalyst so that the amount of the expensive rhodium catalyst can be reduced.

Table 5 illustrates the effect of hydrogen on the reaction time and yield at various concentrations of rhodium catalyst. The results listed were obtained with 1 mole $C_2H_2$ per liter methanol at 130° C.

TABLE 5

| Run No. | Rh (g./l.) | Initial CO (atms.) | Pressure $H_2$ (atms.) | Reaction time (min.) | HQ(t) | HQ(g) |
|---|---|---|---|---|---|---|
| 1 | 0.1 | 250 | 0 | 230 | 61 | |
| 2 | 0.1 | 200 | 100 | 130 | 77 | 58 |
| 3 | 0.2 | 250 | 0 | 180 | 63 | |
| 4 | 0.2 | 200 | 100 | 45 | 66 | 58 |
| 5 | 0.3 | 250 | 0 | 130 | 61 | |
| 6 | 0.3 | 200 | 100 | 55 | 78 | 59 |
| 7 | 0.4 | 250 | 0 | 95 | 62 | |
| 8 | 0.4 | 200 | 100 | 30 | 70 | 65 |
| 9 | 0.5 | 250 | 0 | 75 | 76 | 60 |
| 10 | 0.5 | 200 | 100 | 25 | 72 | 62 |

Hydrogen is effective in an amount of at least 5% by volume of the carbon monoxide, but 10–75% are preferably employed. Table 6 illustrates the effect of hydrogen on the reaction. The conversion of acetylene to acetal of methyl β- and α-formyl propionate, as determined by gas chromatography is listed in percent under β-FP and α-FP. The solvent, catalyst, and temperature were as in Table 3.

TABLE 6

| Run No. | Initial pressure CO (atms.) | $H_2$ (atms.) | Reaction time (min.) | HQ (t) | HQ (g) | SE | β-FP | α-FP |
|---|---|---|---|---|---|---|---|---|
| 1 | 160 | 80 | 46 | 76 | 44 | 4.2 | 1.0 | 3.5 |
| 2 | 200 | 0 | 90 | 62 | 50 | 1.0 | 0 | 0 |
| 3 | 200 | 10 | 75 | 70 | 50 | 12 | (¹) | (¹) |
| 4 | 200 | 20 | 65 | 74 | 54 | 7.7 | 1.3 | 2.8 |
| 5 | 200 | 40 | 60 | 72 | 54 | 7.1 | 0.7 | 1.2 |
| 6 | 200 | 60 | 40 | 79 | 56 | 3.8 | 0.9 | 2.4 |
| 7 | 200 | 80 | 35 | 77 | 54 | 3.9 | 0.9 | 4.0 |
| 8 | 200 | 100 | 25 | 72 | 62 | 1.9 | 1.1 | 8.0 |
| 9 | 200 | 150 | 20 | 82 | 54 | | | |
| 10 | 200 | 200 | 25 | 78 | 51 | | | |
| 11 | 220 | 20 | 70 | 74 | 50 | 11 | (¹) | (¹) |
| 12 | 220 | 30 | 67 | 73 | 47 | 7.9 | 0.7 | 1.3 |
| 13 | 237.5 | 12.5 | 90 | 70 | 59 | 15 | (¹) | (¹) |

¹ Trace.

As is evident from Table 6, an excess of hydrogen does not, or not significantly affect the yield.

In the absence of hydrogen as in Run No. 2 in Table 6, 15–20% of the acetylene is converted to dimethyl fumarate which is only sparingly soluble in the solvent employed, and methyl acrylate is also produced in a yield of several percent.

Even in the presence of hydrogen, the concentration of acetylene is to be held within the range of 0.1–2.0 moles per liter, preferably 0.5–1.5 moles per liter. The effects of higher concentrations of acetylene on the reaction time and the yield of hydroquinone is illustrated in Table 7. The listed results were obtained with 0.5 g. Rh per liter methanol at 130° C. The partial gas pressures in Runs Nos. 1–6 were 225 atm. CO and 25 atm. $H_2$; and in Runs Nos. 7–14 200 atm. CO and 100 atm. $H_2$.

TABLE 7

| Run No. | Concentration of $C_2H_2$ (mole/l.) | Reaction time (min.) | HQ (t) | HQ (g) |
|---|---|---|---|---|
| 1 | 0.25 | 13 | 89 | 71 |
| 2 | 0.50 | 20 | 79 | 58 |
| 3 | 0.75 | 40 | 81 | 69 |
| 4 | 1.0 | 65 | 75 | 47 |
| 5 | 1.25 | 90 | 68 | 44 |
| 6 | 1.5 | 95 | 70 | 38 |
| 7 | 0.25 | 17 | 90 | 53 |
| 8 | 0.50 | 23 | 80 | 59 |
| 9 | 0.75 | 17 | 69 | 61 |
| 10 | 1.0 | 25 | 72 | 62 |
| 11 | 1.25 | 27 | 63 | 52 |
| 12 | 1.5 | 27 | 61 | 48 |
| 13 | 2.0 | 75 | 59 | 48 |
| 14 | 3.0 | 400 | 58 | 32 |

Because hydrogen stabilizes the rhodium catalyst, the reaction may be carried out at somewhat higher temperatures. The preferred range is 110–115° C. The effect of the reaction temperature is illustrated in Table 8, relating to tests performed with one mole $C_2H_2$ and 0.5 g. Rh per liter methanol, a CO pressure of 225 atm., and an $H_2$ pressure of 25 atm.

TABLE 8

| Run No. | Temp. (°C.) | Reaction time (min.) | HO(t) | HO(g) | SE | β-FP | α-FP |
|---|---|---|---|---|---|---|---|
| 1 | 110 | 263 | 81 | 64 | 11 | (1) | (1) |
| 2 | 130 | 45 | 79 | 51 | 6.0 | 1.5 | 5.3 |
| 3 | 150 | 28 | 73 | 47 | 10 | 2.0 | 1.8 |
| 4 | 170 | 6 | 65 | 41 | 5.0 | 4.5 | 4.1 |

[1] Trace.

Hydrogen in the reaction mixture permits a reduction in the amount of catalyst used under otherwise similar conditions. As little as 0.02 g. Rh equivalent per liter is effective in the presence of hydrogen.

Water in the reaction medium accelerates the reaction in the presence of hydrogen as it does in the absence of hydrogen as is evident from Table 9 which lists the results obtained with various mixtures of water and methanol at different catalyst concentrations, the partial pressures of CO and $H_2$ being 200 and 100 atmospheres respectively in all runs.

TABLE 9

| Run No. | Rh (g./l.) | $H_2O$ (volume percent) | Reaction time (min.) | HQ(t) | HQ(g) |
|---|---|---|---|---|---|
| 1 | 0.5 | 0 | 30 | 72 | 62 |
| 2 | 0.5 | 10 | 28 | 67 | 62 |
| 3 | 0.5 | 20 | 10 | 64 | 54 |
| 4 | 0.5 | 30 | 9 | 63 | 60 |
| 5 | 0.3 | 0 | 55 | 78 | 59 |
| 6 | 0.3 | 10 | 19 | 75 | 55 |
| 7 | 0.3 | 20 | 10 | 64 | 54 |
| 8 | 0.3 | 30 | 20 | 63 | 51 |
| 9 | 0.1 | 0 | 130 | 77 | 58 |
| 10 | 0.1 | 10 | 90 | 68 | 53 |
| 11 | 0.1 | 20 | 73 | 62 | 55 |
| 12 | 0.1 | 30 | 71 | 57 | 58 |

We have found that the reaction rate and the stability of the catalyst are further improved when a substance containing iodine, bromine or chlorine, other than the halides of rhodium, is added to the reaction system.

The halogen bearing substance to be employed may be a metal halide, an inorganic halide of a non-metal, an organic halide, or molecular halogen. LiI, NaI, KI, HI, $NH_4I$, $CaI_2$, $SrI_2$, $BaI_2$, $TlI_3$, $MnI_2$, $FeI_2$, $FeI_3$, $CoI_2$, $NiI_2$, CuI, $ZnI_2$, AgI, $CdI_2$, $HgI_2$, $SnI_2$, $PbI_2$, $KIO_3$, $ICl_3$, $(CH_3)_4NI$, $(C_2H_5)_4NI$, $CH_3I$, $C_2H_5I$, $CHI_3$, $I(C_6H_4)COOH$, $I(C_6H_4)NH_2$, $ICH_2COOH$, KBr, KCl, HBr, $CoBr_2$, NaCl, and $I_2$ are among the halogens and halogen compounds which have been used successfully. Iodine and iodine compounds are more effective than the corresponding bromine compounds. Chlorine and chlorine compounds are even less effective. Fuoride compounds and elementary fluorine are not effective.

Although the optimum amounts of these substances vary greatly, they are generally employed at a rate of 0.1–50 moles, preferably 1–20 moles, per mole of rhodium present.

An adequate reaction rate can be achieved in the presence of halogen or halogen compounds with as little rhodium as 0.01–0.05 g./l. The rhodium catalyst is very stable so that the reaction mixture containing the rhodium catalyst can be used repeatedly in a cycle to accumulate hydroquinone. Moreover, the formation and precipitation of inactive rhodium compounds from the reaction mixture does not occur even at temperatures higher than 170° C., such as 200° C. so that the higher reaction rates available at higher temperatures may be utilized. However, a satisfactory reaction rate usually can be achieved even below 170° C.

A solution of rhodium catalyst may be prepared by reacting rhodium metal or a rhodium compound with carbon monoxide in a solvent in the presence of a halogen-bearing substance. An initial CO pressure of less than 150 atmospheres and a temperature of less than 100° C. are sufficient in preparing the catalyst solution.

When a rhodium halide, such as rhodium iodide or rhodium chloride, is used in preparing the rhodium catalyst, it is desirable to add a basic material. Suitable basic materials are the hydroxides, oxides, carbonates and acetates of the alkali metals, of $NH_4$, of the alkaline earth metals, of other metals such as Te, Mn, Fe, Co, Ni, Zn, Cd, Hg, Sn, Pb, Cu and Ag, and nitrogen-containing organic bases such as the alkyl and aryl derivatives of ammonia and pyridine which are capable of forming halides under the prevailing reaction conditions. The basic material is preferably used in an amount at least equivalent to the halogen atoms in the rhodium halide. The further addition of a substance containing halogen atoms other than fluorine is preferred.

The following examples are further illustrative of the present invention, and it will be understood that the invention is not limited thereto.

Example 1

A 1000 ml. autoclave was charged with methanol and 420 mg. rhodium oxide hydrate ($Rh_2O_3 \cdot 5H_2O$), cooled to −70° C., and evacuated. 3000 ml. acetylene (20° C., 760 mm. Hg) were introduced and dissolved in the solvent. Carbon monoxide was then pressed into the autoclave at 250 atmospheres, and the autoclave was heated to 130° C. with stirring. The absorption of the gas was terminated after 10 minutes. After cooling to room temperature, the reaction mixture was discharged from the autoclave.

The same operation was repeated twice and the combined reaction mixtures were concentrated to 70 ml. by evaporating the methanol. Crystals formed in the concentrate after cooling and were recovered by filtration. The crystals weighed 7.9 g. and were identified as dimethyl fumarate by their melting point after recrystallization from methanol.

The filtrate was fractionated at 5–10 mm. Hg, and 12.5 g. of pale yellow crystals of crude hydroquinone were obtained (yield 57%). When recrystallized from water, the material had a melting point of 170–171° C. (uncorrected).

Example 2

A 100 ml. stainless steel autoclave was charged with 50 ml. methanol containing 20% water by volume and 42 mg. rhodium oxide hydrate containing 25 mg. Rh. 50 millimoles acetylene were absorbed in the solvent with cooling, and synthesis gas ($CO:H_2=2:1$) was forced into the autoclave at 300 atmospheres, whereupon the autoclave was heated to 130° C. for 30 minutes while the reaction mixture was stirred. The autoclave was then cooled and evacuated, 50 millimoles acetylene were absorbed in the reaction mixture, and the reaction with synthesis gas was repeated. This cycle was repeated ten times, whereby 0.5 mole acetylene was absorbed. The reaction mixture was washed from the autoclave with methanol and the hydroquinone present was found by gas chromatography to correspond to 62% of the acetylene employed. A part of the reaction mixture corresponding to 0.3 mole acetylene was distilled from a 100 ml. flask equipped with a Widmer spiral. 7.6 g. hydroquinone crystallized from the distillation residue, and 1.3 g. more were recovered from the mother liquor after filtration from the first crop of crystals. The combined crops contained 98% hydroquinone. The pure crystals obtained by recrystallization from water had a melting point of 169–170.5° C. (Yield based on acetylene: 53%.)

Example 3

A 100 ml. autoclave was charged with 50 ml. methanol containing 20% water by volume or with 50 ml. dry methanol, and with a rhodium compound as listed in Table 10, and was then cooled. 50 millimoles acetylene were absorbed in the solvent, and synthesis gas $$(CO:H_2=2:1)$$

was forced into the autoclave which was then heated to 130° C. until gas absorption stopped. The results are summarized in Table 10.

TABLE 10

| Run No. | Methanol | Catalyst | Rh content (g./l.) | Initial pressure of synthesis gas (atms.) | Reaction time | HQ(t) | HQ(g) |
|---|---|---|---|---|---|---|---|
| 1 | Wet | Rhodium acetate | 0.1 | 300 | 87 | 80 | 54 |
| 2 | Wet | RhCl₃ | 0.08 | 290 | 30 | 63 | 41 |
| 3 | Dry | RhI₃ | 0.5 | 286 | 9 | 67 | 38 |
| 4 | Dry | Rh(CO)₃Cl | 0.5 | 300 | 6 | 66 | 49 |

Example 4

A 100 ml. autoclave was charged with 30 ml. water and 20 ml. tetrahydrofuran, and 30 millimoles acetylene were absorbed in the solvent to which 4.2 mg. rhodium oxide hydrate containing 2.5 mg. Rh were added. Synthesis gas (2:1) was forced into the autoclave at a pressure of 300 atmospheres, and the autoclave was heated to 130° C. while the mixture was being stirred. The absorption of gas stopped after 120 minutes, the autoclave was cooled, and its contents were discharged. The yield of hydroquinone, as determined by gas chromatography, was 47%.

Example 5

A 100 ml. autoclave was charged with 50 ml. methanol, 42.4 mg. rhodium oxide hydrate containing 25 mg. Rh, and 31.4 mg. iodine. 51 millimoles acetylene were absorbed with cooling, and carbon monoxide was forced into the autoclave at 253 atmospheres at room temperature. When the reaction mixture was heated to 130° C., with stirring, the reaction was completed after 41 minutes. The autoclave was cooled, emptied, and washed out with methanol. The yield of hydroquinone determined by gas chromatography was 46% based on the acetylene employed.

Example 6

The procedure of Example 5 was repeated with 42.7 mg. rhodium oxide hydrate (25.2 mg. Rh) and 41.7 mg. potassium iodide, at a CO pressure of 251 atmospheres. The reaction was completed in 26 minutes and the yield of hydroquinone was 50%.

Example 7

A 200 ml. autoclave was charged with 100 ml. methanol containing 20% water by volume, 85 mg. rhodium oxide hydrate and 720 mg. potassium iodide. Synthesis gas (CO:H₂—2:1) was forced into the autoclave at 200 atmospheres. The autoclave was heated to 80° C. for 60 minutes with stirring. After cooling and removal of the residual gas, there was obtained a homogeneous solution of rhodium catalyst.

50 ml. of methanol containing 20% water by volume and 1.1 ml. of the catalyst solution containing 0.48 mg. Rh were charged into a 100 ml. autoclave. 50 millimoles acetylene were absorbed in the solvent with cooling and synthesis gas was introduced at 296 atmospheres. The autoclave was heated to 170° C., and the reaction was completed in 47 minutes. The autoclave was cooled and evacuated, and the reaction mixture was washed out with methanol. The yield of hydroquinone was 59%.

Example 8

A 100 ml. autoclave was charged with methanol containing 20% water, 1.0 g. aluminum oxide bearing 5 mg. rhodium and 10.6 mg. cobalt bromide. 51 millimoles acetylene were absorbed in the solvent, and carbon monoxide was introduced at 250 atmospheres at room temperature. The reaction was completed by heating to 130° C. for 35 minutes. The yield of hydroquinone was 65%.

The above process was repeated without addition of cobalt bromide. The time required for the completion of the reaction was 180 minutes and the yield of hydroquinone was 51%.

Example 9

A 100 ml. autoclave was charged with 50 ml. methanol containing 10% water by volume, 0.5 ml. of an aqueous rhodium acetate solution containing 5.5 mg. Rh, and 26 mg. ammonium chloride. 100 millimoles acetylene were absorbed in the mixture with cooling. After synthesis gas (2:1) had been introduced at 300 atmospheres at room temperature, the autoclave was heated to 130° C. with stirring. The reaction was completed in 65 minutes, and the yield of hydroquinone was 52%.

Example 10

A 100 ml. autoclave was charged with 50 ml. methanol, 42 mg. rhodium oxide hydrate (25 mg. Rh), and 49 mg. tetramethylammonium iodide (equimolar to the rhodium), and 50 millimoles acetylene were absorbed in the solvent under cooling. Synthesis gas (2:1) was pressed into the autoclave at 300 atmospheres, and the autoclave was heated to 130° C. with stirring. The reaction was completed in 11 minutes, and the yield of hydroquinone was 59%.

The above process was repeated, first without tetramethylammonium iodide, and then with equimolar amounts of the potassium halides listed in Table 11. The results are listed in Table 11.

TABLE 11

| Run No. | Halide | Reaction time (min.) | HQ(g) |
|---|---|---|---|
| Control | None | 33 | 60 |
| 1 | KI | 14 | 62 |
| 2 | KBr | 22 | 64 |
| 3 | KCl | 21 | 59 |

Example 11

The process of Example 10 was repeated, but the amounts of rhodium oxide and halide were reduced to 20% of those in Example 10. The results are listed in Table 12.

TABLE 12

| Run No. | Halide | Reaction time (min.) | HQ(g) |
|---|---|---|---|
| Control | None | 130 | 58 |
| 1 | (CH₃)₄NI | 33 | 64 |
| 2 | KI | 41 | 57 |
| 3 | KBr | 79 | 61 |

Example 12

The process of Example 11 was repeated with methanol containing 20% water by volume. The results are listed in Table 13.

TABLE 13

| Run No. | Halide | Reaction time (min.) | HQ(g) |
|---|---|---|---|
| Control | None | 77 | 62 |
| 1 | (CH₃)₄NI | 21 | 62 |
| 2 | KI | 26 | 61 |
| 3 | KBr | 48 | 57 |

EXAMPLE 13

A 100 ml. autoclave was charged with 50 ml. methanol containing 20% water by volume, 4.2 mg. rhodium oxide hydrate (2.5 mg. Rh) and 3.6 mg. ammonium iodide (equimolar to the rhodium). 50 millimoles acetlyene were absorbed in the solvent with cooling, and synthesis gas (2:1) was pressed into the autoclave at 300 atmospheres.

When the autoclave was heated to 120° C. with stirring the reaction was completed in 70 minutes and the yield of hydroquinone was 60%, as determined by gas chromatography.

The above process was repeated, but ammonium iodide was replaced by equimolar amounts of the halides listed in Table 14. The results listed in Table 14 are averages of two experiments.

TABLE 14

| Run No. | Halide | Reaction time (min.) | HQ(g) |
|---|---|---|---|
| Control | None | 195 | 47 |
| 1 | $(CH_3)_4NI$ | 65 | 56 |
| 2 | $(C_2H_5)_4NI$ | 50 | 67 |
| 3 | $CH_3I$ | 77 | 66 |
| 4 | $C_2H_5I$ | 72 | 73 |
| 5 | $CHI_3$ | 50 | 61 |
| 6 | $p\text{-}I(C_6H_4)COOH$ | 55 | 72 |
| 7 | $p\text{-}I(C_6H_4)NH_2$ | 130 | 63 |
| 8 | $CH_2ICOOH$ | 65 | 66 |
| 9 | $ICl_3$ | 67 | 59 |
| 10 | $HBr$ | 85 | 60 |
| 11 | $HI$ | 45 | 67 |
| 12 | $PH_4I$ | 52 | 65 |
| 13 | $LiI$ | 60 | 68 |
| 14 | $NaI$ | 87 | 62 |
| 15 | $KI$ | 82 | 62 |
| 16 | $CaI_2$ | 57 | 64 |
| 17 | $SrI_2$ | 67 | 67 |
| 18 | $BaI_2$ | 77 | 63 |
| 19 | $TlI_3$ | 85 | 66 |
| 20 | $MnI_2$ | 77 | 68 |
| 21 | $FeI_2$ | 90 | 59 |
| 22 | $FeI_3$ | 60 | 67 |
| 23 | $NiI_2$ | 65 | 57 |
| 24 | $CuI$ | 76 | 57 |
| 25 | $ZnI_2$ | 50 | 60 |
| 26 | $AgI$ | 80 | 59 |
| 27 | $CdI_2$ | 65 | 58 |
| 28 | $HgI_2$ | 50 | 62 |
| 29 | $SnI_2$ | 75 | 63 |
| 30 | $PbI_2$ | 80 | 64 |
| 31 | $CoBr_2$ | 72 | 57 |
| 32 | $KIO_3$ | 60 | 52 |

Example 14

The process of Example 13 was repeated, but the amount of rhodium oxide hydrate was reduced to 2.54 mg. (1.5 mg. Rh) and the amount of halide was increased to 3 moles per mole of rhodium. The results are listed in Table 15.

TABLE 15

| Run No. | Halide | Reaction time | HQ(g) |
|---|---|---|---|
| Control | None | 320 | 52 |
| 1 | $HgI_2$ | 182 | 46 |
| 2 | $NaI$ | 105 | 61 |
| 3 | $ZnI_2$ | 100 | 58 |
| 4 | $HI$ | 75 | 49 |
| 5 | $(C_2H_5)_4NI$ | 165 | 57 |
| 6 | $PH_4I$ | 83 | 57 |
| 7 | $ICl_3$ | 83 | 54 |
| 8 | $CH_2ICOOH$ | 78 | 56 |
| 9 | $CaI_2$ | 85 | 60 |
| 10 | $NiI_2$ | 95 | 54 |
| 11 | $AgI_2$ | 100 | 63 |
| 12 | $CoBr$ | 175 | 55 |
| 13 | $CdI_2$ | 140 | 55 |
| 14 | $CoI$ | 150 | 56 |

Example 15

A 100 ml. autoclave was charged with 50 ml. methanol containing 20% water by volume, 1.7 mg. rhodium oxide hydrate (1 mg. Rh) and 14.5 mg. sodium iodide (10 moles NaI per mole Rh) and 50 millimoles acetylene were absorbed in the solvent with cooling. Synthesis gas (2:1) was pressed into the autoclave at 290 atmospheres at room temperature, and the autoclave was heated to the temperatures listed in Table 16 with the results shown.

TABLE 16

| Run no. | Reaction temp. (° C.) | Reaction time (min.) | HQ(g) |
|---|---|---|---|
| 1 | 130 | 62 | 64 |
| 2 | 150 | 22 | 60 |
| 3 | 170 | 16 | 47 |
| 4 | 190 | 10 | 51 |
|  | 200 | 5 | 38 |

In a control run without sodium iodide at 160° C. for 200 minutes, only traces of hydroquinone were found in the reaction mixture by gas chromatography.

Example 16

The process of Example 15 was repeated with 1 mg. Rh in the form of catalyst solution prepared by the following method:

A 300 ml. autoclave was charged with 150 ml. methanol containing 20% water, 319 mg. rhodium oxide hydrate and 2.25 g. sodium iodide. Synthesis gas (2:1) was pressed into the autoclave at 100 atmospheres at room temperature. The autoclave was heated to 130° C. for 7 minutes. After cooling and evacuation of the autoclave, a homogeneous catalyst solution was obtained.

The results obtained are listed in Table 17.

TABLE 17

| Run no. | Reaction temp. (° C.) | Reaction time (min.) | HQ(g) |
|---|---|---|---|
| 1 | 130 | 157 | 62 |
| 2 | 150 | 70 | 64 |
| 3 | 170 | 57 | 53 |

A 100 ml. autoclave was charged with 1 ml. of an aqueous rhodium chloride solution (1 mg. Rh), 0.35 ml. N/10 sodium hydroxide solution, 9 ml. water, 40 ml. methanol, and 14.5 mg. sodium iodide (10 moles NaI per mole Rh). 50 millimoles acetylene were absorbed in the solvent, and the procedure of Example 15 was followed thereafter. The results obtained at various reaction temperatures are shown in Table 18.

TABLE 18

| Run no. | Reaction temp. (° C.) | Reaction time (min.) | HQ(g) |
|---|---|---|---|
| 1 | 120 | 115 | 57 |
| 2 | 130 | 95 | 59 |
| 3 | 140 | 45 | 62 |
| 4 | 160 | 21 | 54 |

While the invention has been described with particular reference to specific embodiments, it is to be understood that it is not limited thereto, but is to be construed broadly and restricted solely by the scope of the appended claims.

What is claimed is:

1. In a process of producing hydroquinone by reacting acetylene with carbon monoxide in a liquid medium selected from the group consisting of lower alkanols, formamide, dimethylformamide, α-pyrrolidone, N-methyl-α-pyrrolidone, acetone, dioxane, tetrahydrofuran, pyridine, water and mixtures thereof, in the presence of an effective amount of rhodium catalyst selected from the group consisting of rhodium metal, rhodium compounds which are soluble in the solvent employed under the reaction conditions and rhodium compounds which are converted to soluble compounds under the reaction conditions while said medium is confined in a substantially closed vessel, the improvement which comprises:

(a) the concentration of said acetylene in said medium being between 0.1 and 2.0 moles per liter,
(b) the partial pressure of said carbon monoxide in said vessel being between 150 and 500 atmospheres as measured at room temperature, and
(c) the temperature of said medium during the reaction being between 100 and 170 degrees centigrade.

2. A process as set forth in claim 1, wherein said concentration of acetylene is between 0.5 and 1.5 moles per liter.

3. A process as set forth in claim 1, wherein said partial pressure is between 150 and 300 atmospheres.

4. A process as set forth in claim 1, wherein the amount of said catalyst is equivalent to 0.1 to 0.5 gram of rhodium per liter of said medium.

5. A process as set forth in claim 1, wherein said medium is a mixture of water and of an organic solvent miscible with said water.

6. A process as set forth in claim 1, wherein said acetylene is reacted with said carbon monoxide in the presence of an amount of hydrogen equal to 5 to 100 percent of said carbon monoxide by volume.

7. A process as set forth in claim 6, wherein said amount of hydrogen is between 10 and 75 percent of said carbon monoxide by volume.

8. A process as set forth in claim 6, wherein said concentration of acetylene is between 0.5 and 1.5 moles per liter, said temperature is between 110 and 150 degrees centigrade, and the amount of said catalyst is equivalent to 0.02 to 0.5 gram of rhodium per liter of said medium.

9. A process as set forth in claim 6, wherein said medium is a mixture of water and of an organic solvent.

10. A process as set forth in claim 1, wherein said medium further contains 0.1 to 50 moles of chlorine, bromine, or iodine in the form of a halogen compound other than a rhodium compound or of elementary halogen.

11. A process as set forth in claim 10, wherein said concentration of acetylene is 0.5 to 1.5 moles per liter, and the amount of said catalyst is equivalent to 0.01 to 0.5 g. rhodium per liter of said medium.

12. A process as set forth in claim 10, wherein said halogen compound is a member of the group consisting of $KX$, $NaX$, $LiX$, $HX$, $NH_4X$, $(CH_3)_4NX$, $(C_2H_5)_4NX$, $CaX_2$, $SrX_2$, $BaX_2$, $TlX_3$, $MnX_2$, $FeX_2$, $FeX_3$, $CoX_2$, $NiX_2$, $CuX$, $ZnX_2$, $AgX$, $CdX_2$, $HgX_2$, $SnX_2$, $PbX_2$, $X_2$, $KXO_3$, $CH_3X$, $C_2H_5X$, $CHX_3$, $X(C_6H_4)COOH$, $X(C_6H_4)NH_2$, $XCH_2COOH$, and $ICl_3$, X being iodine, bromine, or chlorine.

13. A process as set forth in claim 10, wherein said catalyst is prepared by reacting a rhodium halide with an oxide, hydroxide, carbonate, or acetate of an alkali metal, of an alkaline earth metal, of Tl, Mn, Fe, Co Ni, Cu, Zn, Ag, Cd, Hg, Sn, Pb, $NH_4$, or a nitrogen containing organic base.

14. A process as set forth in claim 10, wherein said halogen is iodine.

References Cited

UNITED STATES PATENTS 3,055,949    9/1962    Howk et al. _____ 260—621

FOREIGN PATENTS 1,430,131    1/1966    France.

OTHER REFERENCES

Chemistry of Carbon Compounds, ed. by E. Rodd, Amsterdam, Elsevier Publishing Company, 1956, vol. III, pp. 696–7.

LEON ZITVER, *Primary Examiner.*

H. ROBERTS, *Assistant Examiner.*

U.S. Cl. X.R.

260—479